United States Patent
Kim et al.

(10) Patent No.: US 9,823,520 B2
(45) Date of Patent: Nov. 21, 2017

(54) LIQUID CRYSTAL DISPLAY APPARATUS AND METHOD FOR MANUFACTURING THE SAME

(71) Applicant: Samsung Display Co., Ltd., Yongin, Gyeonggi-Do (KR)

(72) Inventors: Gwan-Soo Kim, Asan-si (KR); Hyun-Soo Ryu, Daejeon (KR); Jung-Hyun Ahn, Daejeon (KR); Hyung-Guen Yoon, Hwaseong-si (KR); Hye-Won Jang, Asan-si (KR); Hye-Young Han, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 212 days.

(21) Appl. No.: 14/563,020

(22) Filed: Dec. 8, 2014

(65) Prior Publication Data
US 2015/0168763 A1    Jun. 18, 2015

(30) Foreign Application Priority Data
Dec. 13, 2013  (KR) .................. 10-2013-0155211

(51) Int. Cl.
*G02F 1/1335*    (2006.01)
*G02F 1/1339*    (2006.01)
*G02F 1/1362*    (2006.01)

(52) U.S. Cl.
CPC ........ *G02F 1/13394* (2013.01); *G02F 1/1362* (2013.01); *G02F 1/133514* (2013.01)

(58) Field of Classification Search
CPC ........ G02F 2001/136222; G02F 2001/133519; G02F 1/133514
See application file for complete search history.

(56) References Cited

U.S. PATENT DOCUMENTS

| | | | |
|---|---|---|---|
| 6,433,852 B1 * | 8/2002 | Sonoda ............ | G02F 1/134363 349/141 |
| 6,501,529 B1 * | 12/2002 | Kurihara ............. | G02F 1/13338 345/173 |
| 7,026,100 B2 | 4/2006 | Nakata et al. | |
| 7,595,855 B2 | 9/2009 | Lee et al. | |
| 7,742,130 B2 | 6/2010 | Kim | |
| 7,760,318 B2 | 7/2010 | Lee et al. | |

(Continued)

FOREIGN PATENT DOCUMENTS

| | | |
|---|---|---|
| JP | 2002-350868 A | 12/2002 |
| KR | 1020070069829 A | 7/2007 |
| KR | 1020150015576 A | 2/2015 |

*Primary Examiner* — Phu Vu
(74) *Attorney, Agent, or Firm* — Cantor Colburn LLP (57) ABSTRACT

A liquid crystal display apparatus includes a first substrate, a second substrate, a thin-film transistor ("TFT"), a color filter, a pixel electrode, a planarizing layer and a first column spacer. The second substrate faces the first substrate. The TFT is on the first substrate. The color filter is on the TFT. The pixel electrode is on the color filter. The planarizing layer covers the color filter and the pixel electrode, and includes a hybride resin including silane. The first column spacer protrudes from an upper surface of the planarizing layer and maintains a cell gap between the first substrate and the second substrate. The first column spacer is on the TFT. The first column spacer includes the hybride resin including silane.

15 Claims, 5 Drawing Sheets

(56) References Cited

U.S. PATENT DOCUMENTS

| | | |
|---|---|---|
| 8,107,048 B2 | 1/2012 | Kim et al. |
| 2001/0026347 A1* | 10/2001 | Sawasaki .......... G02F 1/133707 349/156 |
| 2001/0041394 A1* | 11/2001 | Park ..................... G02F 1/1362 438/151 |
| 2002/0140891 A1* | 10/2002 | Tomioka ........... G02F 1/134363 349/141 |
| 2007/0291217 A1 | 12/2007 | Kang et al. |
| 2010/0020258 A1 | 1/2010 | Chang |
| 2010/0148176 A1* | 6/2010 | Son ................... G02F 1/133514 257/59 |
| 2012/0189961 A1* | 7/2012 | Ji ............................ G03F 7/027 430/281.1 |
| 2013/0100386 A1* | 4/2013 | Kim .................... G02F 1/13394 349/110 |
| 2013/0169901 A1* | 7/2013 | Kim ................. H01L 29/78633 349/43 |

\* cited by examiner

LIQUID CRYSTAL DISPLAY APPARATUS AND METHOD FOR MANUFACTURING THE SAME

This application claims priority to Korean Patent Application No. 10-2013-0155211, filed on Dec. 13, 2013, and all the benefits accruing therefrom under 35 U.S.C. §119, the contents of which are herein incorporated by reference in their entireties.

BACKGROUND

1. Field

Exemplary embodiments of the invention relate to a liquid crystal display apparatus and a method for manufacturing the liquid crystal display apparatus. More particularly, exemplary embodiments of the invention relate to a liquid crystal display apparatus improving transmissivity and a margin of liquid crystal, and a method for manufacturing the liquid crystal display apparatus.

2. Description of the Related Art

A liquid crystal display apparatus is one flat panel display which is used broadly. Examples of the flat panel display include, but are not limited to, a liquid crystal display ("LCD"), a plasma display panel ("PDP") and an organic light emitting display ("OLED").

The liquid crystal display apparatus applies voltages to specific molecules of liquid crystal within a liquid crystal cell to convert arrangements of the molecules and change optical characteristics of the liquid crystal cell such as birefringence, optical activity, dichroism and light scattering, to display an image.

The liquid crystal display apparatus displays an image by the liquid crystal within the liquid crystal cell. The liquid crystal display apparatus is relatively thin and light-weight, and has low power consumption and low driving voltage.

Generally, the liquid crystal display apparatus includes two substrates (or display panels) disposed on as an upper surface and a lower surface of the liquid crystal display apparatus. The liquid crystal display apparatus may include a stepped height on an area overlapping a thin-film transistor and a color filter within the display panels. Thus, transmissivity of the liquid crystal display apparatus may decrease.

SUMMARY

One or more exemplary embodiment of the invention provides a liquid crystal display apparatus capable of maintaining a cell gap within a liquid crystal cell thereof. One or more exemplary embodiment of the invention also provides a method of manufacturing the liquid crystal display apparatus.

According to an exemplary embodiment, a liquid crystal display apparatus includes a first substrate, a second substrate, a thin-film transistor ("TFT"), a color filter, a pixel electrode, a planarizing layer and a first column spacer. The second substrate faces the first substrate. The TFT is on the first substrate. The color filter is on the TFT. The pixel electrode is on the color filter. The planarizing layer covers the color filter and the pixel electrode, and includes a hybride resin including silane. The first column spacer protrudes from an upper surface of the planarizing layer and maintains a cell gap between the first substrate and the second substrate. The first column spacer is on the TFT. The first column spacer includes the hybride resin including silane.

In an exemplary embodiment, a thickness of the planarizing layer may be within a range of about 0.5 micrometer ($\mu m$) to about 2.0 micrometers ($\mu m$).

In an exemplary embodiment, a height of the first column spacer may be within a range of about 0.5 $\mu m$ to about 3.0 $\mu m$.

In an exemplary embodiment, the liquid crystal display apparatus may further include a black column spacer. The black column spacer may be on the second substrate. The black column spacer may include a black matrix, and a second column spacer on the black matrix.

In an exemplary embodiment, a material of the black matrix may be substantially the same as a material of the second column spacer.

In an exemplary embodiment, the second column spacer may face the first column spacer.

In an exemplary embodiment, the first column spacer may include a main column spacer and a sub column spacer. The main column spacer may face the second column spacer. The sub column spacer may be adjacent to the main column spacer, and face the black matrix.

In an exemplary embodiment, a height of the main column spacer may be substantially the same as a height of the sub column spacer.

In an exemplary embodiment, a gap between the main column spacer and the sub column spacer may be within a range of about 2.0 $\mu m$ to about 3.0 $\mu m$.

In an exemplary embodiment, a height of the second column spacer may be within a range of about 0.5 $\mu m$ to about 2.0 $\mu m$.

In an exemplary embodiment, the liquid crystal display apparatus may further include an overcoating layer on the black column spacer.

In an exemplary embodiment, the liquid crystal display apparatus may further include a liquid crystal layer between the first substrate and the second substrate.

In accordance with an exemplary embodiment, a method of manufacturing a liquid crystal display apparatus includes forming a TFT on a first substrate, forming a color filter by coating a color filter photoresist on the TFT, forming a pixel electrode on the color filter, forming a silane layer on the color filter and the pixel electrode by coating a hybride resin including silane, forming a photoresist mask on the silane layer, the photoresist mask overlapping with the TFT and forming a planarizing layer and a first column spacer at substantially the same time by drying the silane layer. The planarizing layer covers the color filter and the pixel electrode. The first column spacer protrudes from an upper surface of the planarizing layer, is on the TFT, and includes the hybride resin including silane.

In an exemplary embodiment, the hybride resin including silane may include 3-methacryloxypropyldichlorosilane, 3-methacryloxypropyltrichlorosilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, (methacryloxymethyl)methyldimethoxysilane, (methacryloxymethyl)trimethoxysilane, (methacryloxymethyl)methyldiethoxysilane, methacryloxymethyltriethoxysilane, methacryloxypropyltriisopropoxysilane, 3-acryloxypropyldichlorosilane, 3-acryloxypropyltrichlorosilane, 3-acryloxypropylmethyldimethoxysilane, or 3-acryloxypropylmethoxysilane.

In an exemplary embodiment, the method may further include forming a black column spacer on a second substrate. The black column spacer may include a black matrix, and a second column spacer on the black matrix.

In an exemplary embodiment, the second column spacer may be integral with the black matrix.

In an exemplary embodiment, forming the black column spacer may include coating a black photoresist on the second substrate, irradiating a first light to the black photoresist and developing the irradiated black photoresist, irradiating a second light to the black photoresist, the second light having an intensity less than an intensity of the first light, and drying the black photoresist by heating.

In an exemplary embodiment, the black photoresist may be negative-type photoresist.

In an exemplary embodiment, the black photoresist may include two initiators having maximum energy absorption wavelengths different from each other.

In an exemplary embodiment, the black photoresist may include a first initiator and a second initiator. The first initiator may have a first maximum energy absorption wavelength reacting with a wavelength of the first light. The second initiator may have a second maximum energy absorption wavelength reacting with a wavelength of the second light.

In one or more exemplary embodiment, the liquid crystal display apparatus includes the planarizing layer on the color filter and the pixel electrode, so that a stain of the liquid crystal display apparatus may decrease, and transmissivity of the liquid crystal display apparatus may be improved. The planarizing layer and the column spacer may be formed at substantially the same time, so that a mask process forming a column spacer may be omitted. Thus, a manufacture cost may decrease.

Furthermore, in one or more exemplary embodiment, the black column spacer has a double stepped height and faces the column spacer. The column spacer includes a main column spacer and a sub column spacer. A gap between the main column spacer and an opposite substrate and a gap between the sub column spacer and the opposite substrate are different from each other. Thus, a stress by a pressure of the liquid crystal display apparatus may be efficiently dispersed.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

Figure 1:
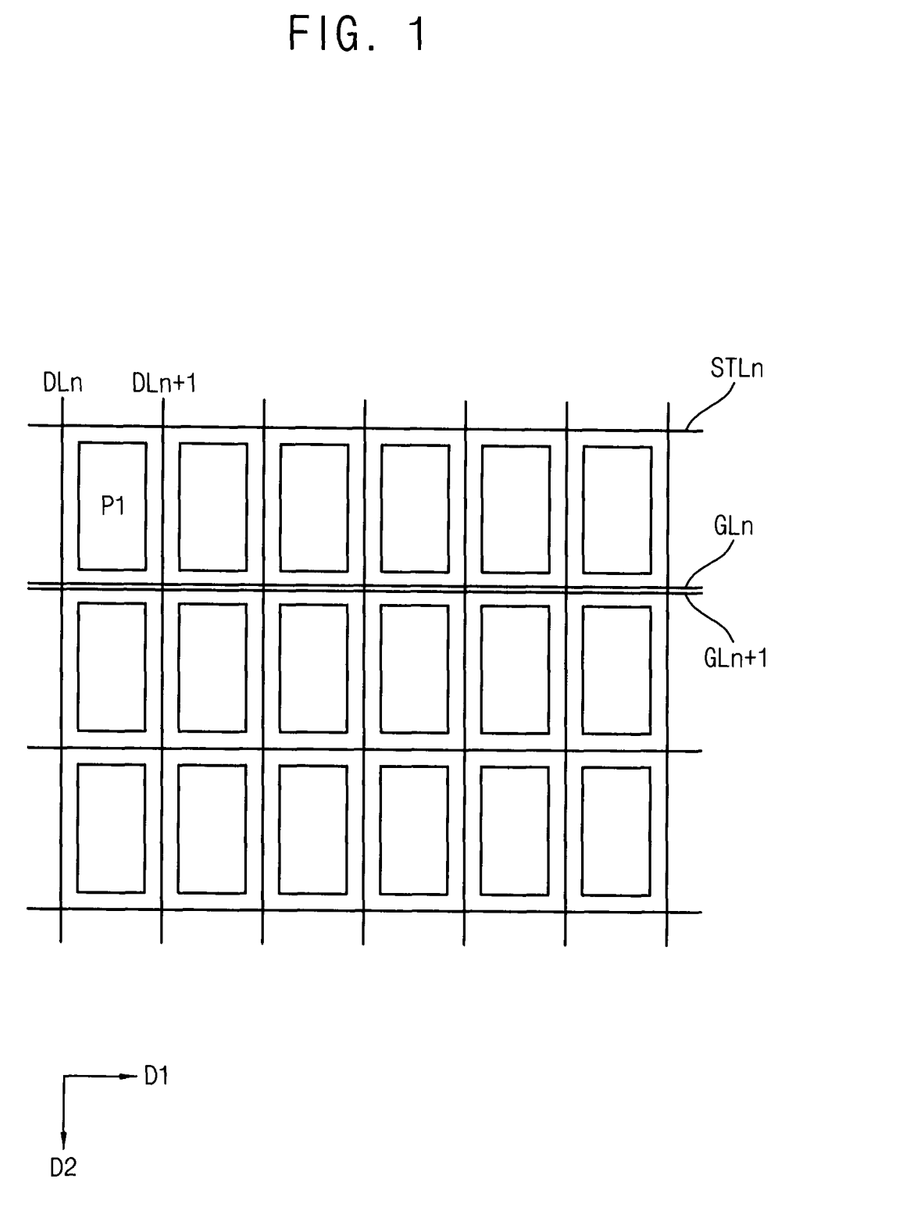
FIG. 1 is a plan view illustrating an exemplary embodiment of a liquid crystal display apparatus.
Figure 2:
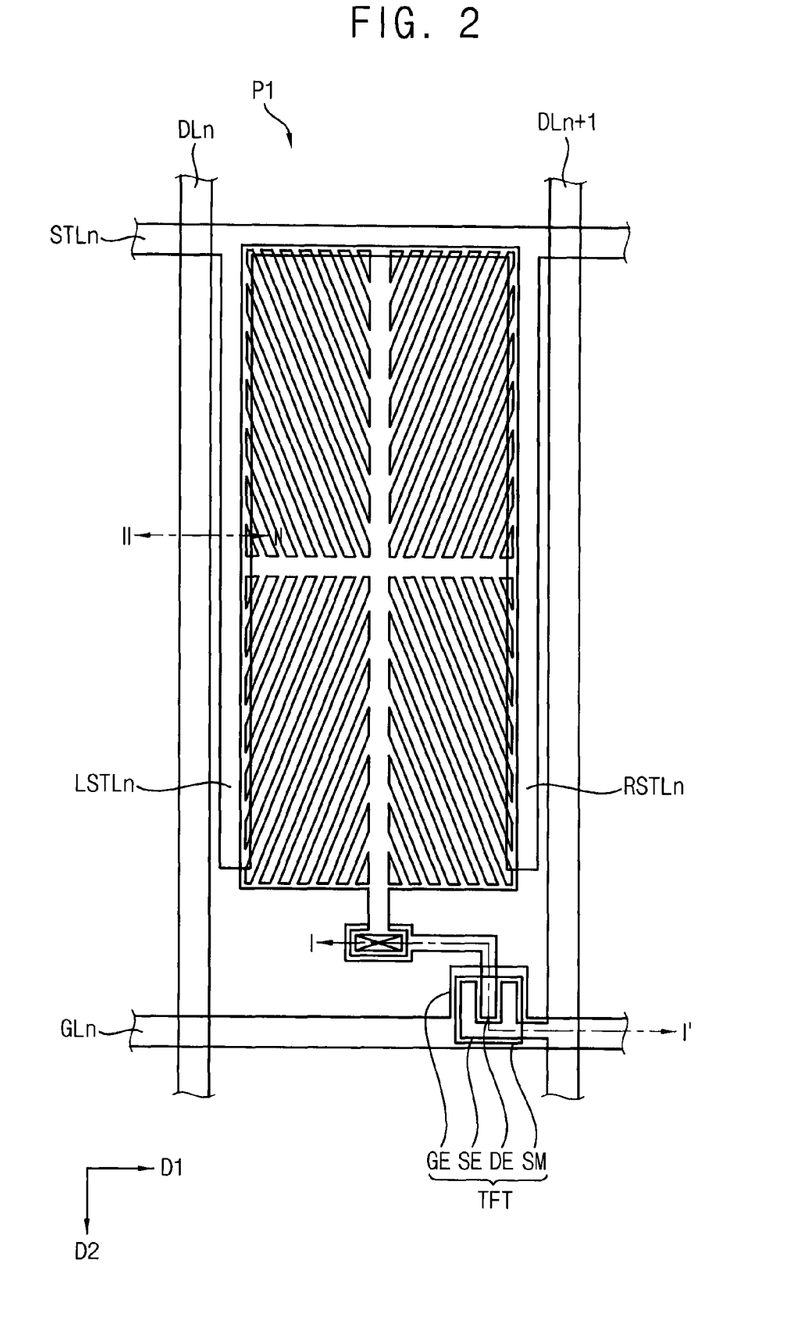
FIG. 2 is a plan view illustrating an exemplary embodiment of a first pixel P1 of FIG. 1.
Figure 3:
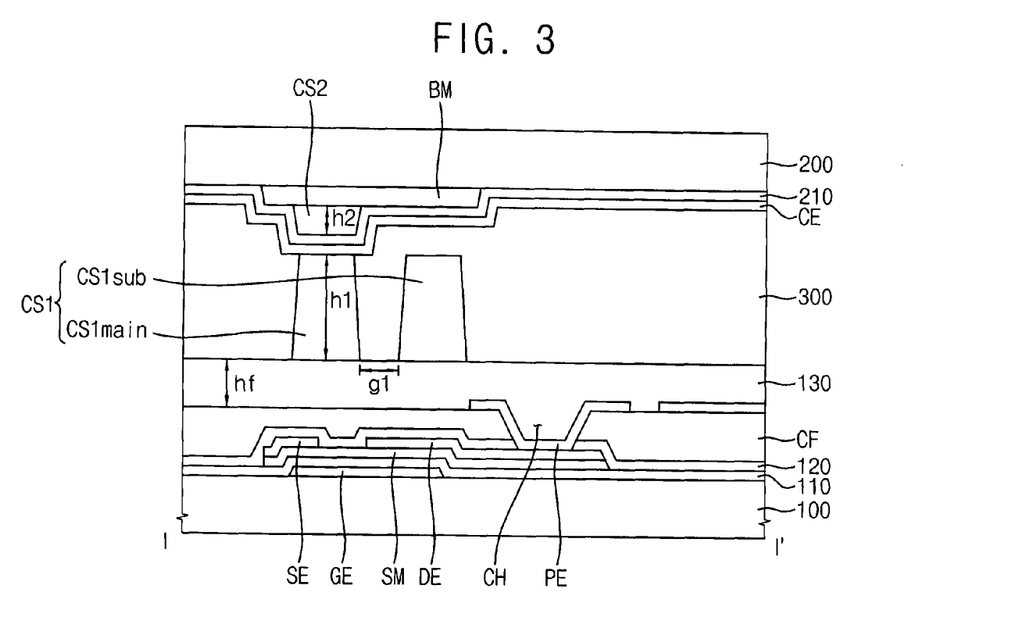
FIG. 3 is a cross-sectional view taken along line I-I' of FIG. 2.
Figure 4:
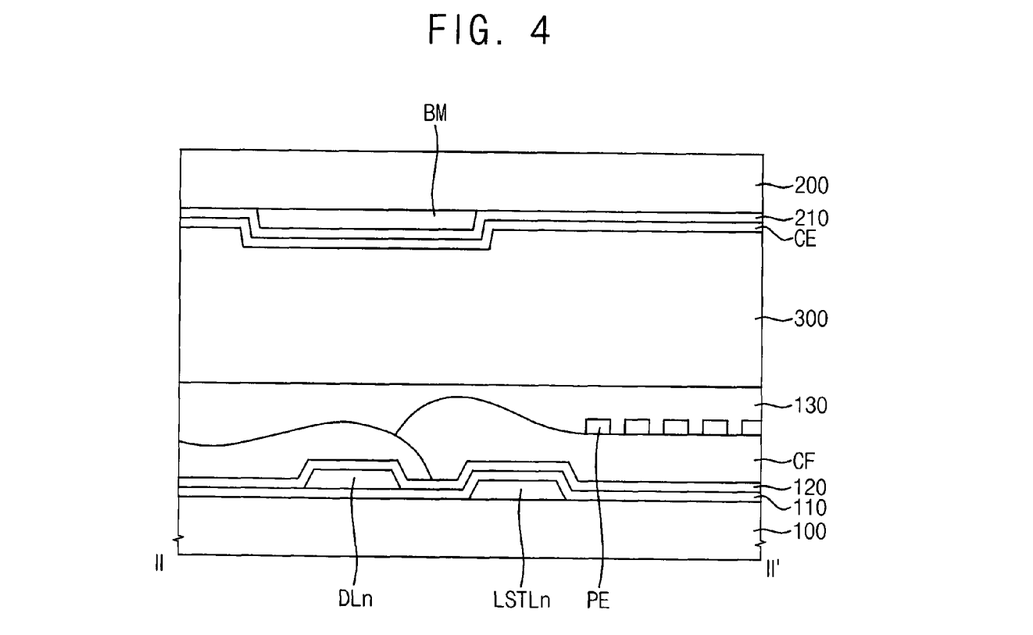
FIG. 4 is a cross-sectional view taken along line II-II' of FIG. 2.

FIG. 1 is a plan view illustrating an exemplary embodiment of a liquid crystal display apparatus. FIG. 2 is a plan view illustrating an exemplary embodiment of a first pixel P1 of FIG. 1. FIG. 3 is a cross-sectional view taken along line I-I' of FIG. 2. FIG. 4 is a cross-sectional view taken along line II-II' of FIG. 2.

Referring to FIGS. 1 and 2, a liquid crystal display apparatus includes a plurality of storage lines STL, a plurality of gate lines GL, a plurality of data lines DL and a plurality of pixels P.

The gate lines GL may extend along a first direction D1. The data lines DL may extend along a second direction D2 crossing the first direction D1. Alternatively, the data lines DL may extend along the first direction D1, and the gate lines GL may extend along the second direction D2.

The storage lines STL may extend along the first direction D1. The gate lines GL may be disposed between adjacent storage lines STL.

A storage line STLn among the plurality of storage lines STL may include a first diverging portion LSTLn and a second diverging portion RSTLn which each extend from a main portion of the storage line STLn along the second direction D2.

The pixels may be disposed in a matrix shape. In an exemplary embodiment, the pixels P may be respectively disposed on an area defined by the storage lines STL, the gate lines GL and the data lines DL, but the invention is not limited thereto.

Each pixel P may be connected to a gate line GL and a data line DL among the plurality of gate lines GL and the plurality of data lines DL, adjacent thereto.

The pixel P may have a rectangular shape in the plan view having a longitudinal (or long) sides extending along the second direction D2, and transverse (or short) sides extending along the first direction D1. Alternatively, the pixel may have a V-shape, a Z-shape or the like in the plan view.

Referring to FIGS. 2 to 4, the liquid crystal display apparatus includes a first substrate 100 of a lower display panel, a second substrate 200 of an upper display panel, and a liquid crystal layer 300.

The liquid crystal display apparatus further includes a thin-film transistor ("TFT"), a color filter CF, a pixel electrode PE, a planarizing layer 130 and a first column spacer CS1 disposed on the first substrate 100.

The first substrate 100 may be a transparent insulation substrate. Examples of the transparent insulation substrate may be, but are not limited to, a glass substrate, a plastic substrate or the like. The first substrate 100 may include a plurality of pixel areas for displaying an image. A plurality of the pixel areas may be disposed in a matrix shape having a plurality of rows and a plurality of columns.

Each pixel P may further include a switching element. In an exemplary embodiment, for example, the switching element may be the TFT. The switching element may be connected to the gate line GLn and the data line DLn adjacent to the switching element. The switching element may be disposed at a crossing area of the gate line GLn and the data line DLn, but the invention is not limited thereto.

A gate pattern may be disposed on the first substrate 100. The gate pattern may include a gate electrode GE and the gate line GLn. The gate line GLn is physically and/or electrically connected to the gate electrode GE.

A gate insulation layer 110 may be disposed on the first substrate 100 to cover the gate pattern and may insulate the gate pattern from other elements of the lower display panel.

A semiconductor pattern SM may be disposed on the gate insulation layer 110. The semiconductor pattern SM may overlap the gate electrode GE.

A data pattern may be disposed on the semiconductor pattern SM, which is formed on the gate insulation layer 110. The data pattern may include a data line DLn, a source electrode SE and a drain electrode DE. The source electrode SE may overlap the semiconductor pattern SM. The source electrode SE may be physically and/or electrically connected to the data line DLn.

The drain electrode DE may be spaced apart from the source electrode SE with respect to an exposed portion of the semiconductor pattern SM. The semiconductor pattern SM may have a conductive channel including the exposed portion of the semiconductor pattern SM between the source electrode SE and the drain electrode DE.

The TFT may include the gate electrode GE, the source electrode SE, the drain electrode DE and the semiconductor pattern SM.

The data line DLn may be disposed on the gate insulation layer 110. The switching element may include the gate electrode GE, the gate insulation layer 110, the semiconductor pattern SM, the source electrode SE and the drain electrode DE. The gate insulation layer 110 may be disposed on a whole surface of the first substrate 100.

The gate insulation layer 110 may include an organic insulation material or an inorganic insulation material. In an exemplary embodiment, for example, the gate insulation layer 110 may include benzocyclobutene polymer, olefin polymer, polyimide polymer, acryl polymer, polyvinyl polymer, siloxane polymer, silicon polymer or the like.

A data insulation layer 120 may be disposed on the gate insulation layer 110 and may insulate the data pattern from other elements of the lower display panel.

The data insulation layer 120 may be disposed on the gate line GL, the data line DL and the TFT. The data insulation layer 120 may be disposed on a whole surface of the first substrate 100.

The data insulation layer 120 may include an organic insulation material or an inorganic insulation material. In an exemplary embodiment, for example, the data insulation layer 120 may include benzocyclobutene polymer, olefin polymer, polyimide polymer, acryl polymer, polyvinyl polymer, siloxane polymer, silicon polymer or the like.

The liquid crystal display apparatus further includes a plurality of color filters CF which collectively form a color filter layer. The color filters CF may be disposed on the data insulation layer 120.

The color filters CF may provide a color to light which passes through the liquid crystal layer 300. The color filters CF may include a red color filter, a green color filter and a blue color filter, but the invention is not limited thereto.

Each color filter CF among the plurality of color filters CF may correspond to a single one of the pixel areas. Color filters CF, which are adjacent to each other, may have colors different from each other.

The color filters CF which are adjacent to each other, may be overlapped with each other at a border portion between pixel areas adjacent to each other. Alternatively, the color filters CF may be spaced apart from the border portion between pixel areas adjacent to each other. Thus, the color filters CF may be respectively formed in an island (e.g., discrete) shape and extend along the gate lines GL in the first direction D1.

The pixel electrode PE may be disposed on the color filter CF.

The pixel electrode PE may be electrically connected to the TFT via a contact hole CH defined in the data insulating layer 120 and/or the color filter CF. The pixel electrode PE may be disposed in the pixel area. A grayscale voltage may be applied to the pixel electrode PE through the TFT.

The pixel electrode PE may include a transparent conductive material, such as indium tin oxide ("ITO"), indium zinc oxide ("IZO"), aluminum zinc oxide ("AZO") or the like. In an exemplary embodiment, for example, a fine slit pattern may be defined in the pixel electrode PE to form branch electrodes of the pixel electrode PE.

The planarizing layer 130 may be disposed on the color filter CF. The planarizing layer 130 may cover the color filter CF and the pixel electrode PE.

The planarizing layer 130 may be disposed on the first substrate 100 of the lower display panel.

The planarizing layer 130 may planarize a stepped height formed by a plurality of thin-films of the lower display panel on the first substrate 100. Thus, a stain of a liquid crystal display apparatus due to the stepped height may decrease.

The planarizing layer 130 may include a silane-based hybride resin.

In an exemplary embodiment, for example, the silane-based hybride resin may be 3-methacryloxypropyldichlorosilane, 3-methacryloxypropyltrichlorosilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, (methacrylo xymethyl)methyldimethoxysilane, (methacryloxymethyl)trimethoxysilane, (methacrylo xymethyl)methyldiethoxysilane, methacryloxymethyltriethoxysilane, methacryloxypropyltriisopropoxysilane, 3-acryloxypropyldichlorosilane, 3-acryloxypropyltrichlorosilane, 3-acryloxypropylmethyldimethoxysilane, 3-acryloxypropylmethoxysilane or a combination thereof.

Generally, a silane-based resin has a low glass temperature (Tg) within a range of about 100 degrees Celsius (° C.) to about 200° C., so that the silane-based resin has excellent flow characteristics. Therefore, the silane-based hybride resin including the silane-based resin has excellent flow characteristics. The planarizing layer 130 may include the silane-based hybride resin, so that a flatness of an upper surface of the planarizing layer 130 may be improved.

A thickness hf of the planarizing layer 130 may be within a range of about 0.5 micrometer (μm) to about 2.0 micrometers (μm). When the thickness hf of the planarizing layer 130 is less than 0.5 μm, the stepped height formed by the thin-films may not be removed. When the thickness hf of the planarizing layer 130 is more than 2.0 μm, a thickness of the liquid crystal display apparatus may increase.

A first column spacer CS1 may protrude from an upper surface of the planarizing layer 130. The first column spacer CS1 may maintain a cell gap between the first substrate 100 and the second substrate 200 or between the lower and upper display panels respectively including the first and second substrates 100 and 200.

The pixel may include a display area in which an image is displayed, and a non-display area in which the image is not displayed. The first column spacer CS1 may be formed in the non-display area of the pixel. In an exemplary embodiment, for example, the first column spacer CS1 may be disposed on the TFT. The first column spacer CS1 may overlap the TFT in the plan view.

The first column spacer CS1 may include a material substantially the same as a material of the planarizing layer 130. The first column spacer CS1 may include the silane-based hybride resin. The first column spacer CS1 and the planarizing layer 130 may be formed at substantially the same time and may be in a same layer of the lower display panel. The first column spacer CS1 and the planarizing layer 130 may be integral with each other, such that the first column spacer CS1 and the planarizing layer 130 form a single, unitary, indivisible member.

A height h1 of the first column spacer CS1 may be within a range of about 0.5 μm to about 3.0 μm. When the height h1 of the first column spacer CS1 is less than 0.5 μm, a liquid crystal injection margin may decrease, so that a quality of the liquid crystal display apparatus may decrease. When the height h1 of the first column spacer CS1 is more than 3.0 μm, a thickness of the liquid crystal display apparatus may increase.

The second substrate 200 may be a transparent insulation substrate. Examples of the transparent insulation substrate may be, but are not limited to, a glass substrate, a plastic substrate or the like.

The second substrate 200 may include a black column spacer to block light. The black column spacer may be disposed in the non-display area of the pixel area.

The black column spacer may be overlapped with the gate lines GL, the data lines DL and the TFT disposed on the first substrate 100.

The black column spacer may include a black matrix BM and a second column spacer CS2. The black matrix BM and the second column spacer CS2 may be disposed on the TFT. The black matrix BM and the second column spacer CS2 may overlap the TFT in the plan view.

The second column spacer CS2 may be disposed on the black matrix BM. The black matrix BM may be integrated with the second column spacer CS2 such that the second column spacer CS2 and the black matrix BM form a single, unitary, indivisible member.

The black matrix BM and the second column spacer CS2 may include a substantially same material.

The black matrix BM and the second column spacer CS2 may include a black material including a photosensitive organic material. In an exemplary embodiment, for example, the black material may include a coloring agent, such as carbon black, an organic and/or inorganic material, color pigment or the like to represent black.

The first column spacer CS1 may include a main column spacer CS1main and a sub column spacer CS1sub. A height h1 of the main column spacer CS1main may be substantially the same as a height of the sub column spacer CS1sub, taken from a same surface such as the upper surface of the planarizing layer 130.

The second column spacer CS2 may face the first column spacer CS1. In an exemplary, for example, the main column spacer CS1main may face the second column spacer CS2. The subs column spacer CS1sub may be adjacent to the main column spacer CS1main and both face the black matrix BM Thus, a gap in a cross-sectional thickness direction between the main column spacer CS1main and the second substrate 200 is less than that between the sub column spacer CS1sub and the second substrate 200.

When a pressure is applied to the liquid crystal display apparatus, an upper surface of the sub column spacer CS1sub may make contact with the black matrix BM or other element on the second substrate 200 of the upper display panel. Thus, a stress caused by the pressure applied to the liquid crystal display apparatus may be dispersed by the main column spacer CS1main and the sub column spacer CS1sub.

A gap g1 in the plan view between the main column spacer CS1main and the sub column spacer CS1sub may be within a range of about 2.0 μm to about 3.0 μm. When the gap g1 is less than 2.0 μm, both of the main column spacer CS1main and the sub column spacer CS1sub may contact the black matrix BM or other element and the second column spacer CS2. When the gap g1 is more than 3.0, the sub column spacer CS1sub may not be disposed to face the black matrix BM.

A height h2 of the second column spacer CS2 may be within a range of about 0.5 μm to about 2.0 μm. When the height h2 of the second column spacer CS2 is less than 0.5 μm, the liquid injection margin may decrease, so that a quality of the liquid crystal display apparatus may decrease. When the height h2 of the second column spacer CS2 is less than 2.0 μm, a thickness of the liquid crystal display apparatus may increase.

An overcoating layer 210 may be disposed on the black column spacer. The black column spacer may be disposed on the second substrate 200.

The overcoating layer 210 may planarize a surface of the second substrate 200.

The overcoating layer 210 may include an organic insulation material and/or an inorganic insulation material. In an exemplary embodiment, for example, the overcoating layer 210 may include benzocyclobutene polymer, olefin polymer, polyimide polymer, acryl polymer, polyvinyl polymer, siloxane polymer, silicon polymer or the like.

A common electrode CE may be disposed on the overcoating layer 210.

A gray scale voltage is applied to the pixel electrode PE and the common electrode CE to form an electric field. In an exemplary embodiment, for example, the common electrode CE may include a transparent conductive material such as ITO, IZO, AZO or the like. In an exemplary embodiment, for example, a slit pattern may be defined in the common electrode CE to form branch electrodes of the common electrode CE.

The liquid crystal layer 300 may be disposed between the first substrate 100 and the second substrate 200, and between the upper and lower display panels.

The liquid crystal layer 300 may include a liquid crystal molecule. An alignment of the liquid crystal molecule in the liquid crystal layer 300 may be controlled by the electric field formed between the pixel substrate PE and the common electrode CE. Therefore, a light transmittance of a pixel may be controlled. Alternatively, the liquid crystal layer may be an electrophoresis layer.

Although not shown in the figures, the liquid crystal display apparatus may include an alignment layer (not shown) to align liquid crystal molecules in the liquid crystal layer 300.

The alignment layer (not shown) may be disposed between the liquid crystal layer 300 and the planarizing layer 130, and between the liquid crystal layer 300 and the over-coating layer 210.

The alignment layer pre-tilts the liquid crystal molecules in the liquid crystal layer 300. The alignment layer may include an alignment liquid. In an exemplary embodiment of manufacturing a display panel, the alignment liquid may be provided on the first substrate 100 and/or the second substrate 200, and then the alignment liquid may be partially removed. The alignment liquid may be coated by a slit coating, a spin coating or the like. The alignment liquid may be partially removed at a room temperature or by heating. The alignment liquid may include a combination of an alignment material, such as polyimide ("PI"), with a solvent.

However, the alignment layer may be omitted in accordance with a type of the liquid crystal layer 300, or a structure of the pixel electrode PE and the common electrode CE. In an exemplary embodiment, for example, when a micro (e.g., fine) slit is defined in the pixel electrode PE, the liquid crystal molecules may be aligned without the alignment layer, and thus, the alignment layer may be omitted. Alternatively, when a reactive mesogen layer for the liquid crystal alignment is disposed, the above-described alignment layer may be omitted.

Figure 5:
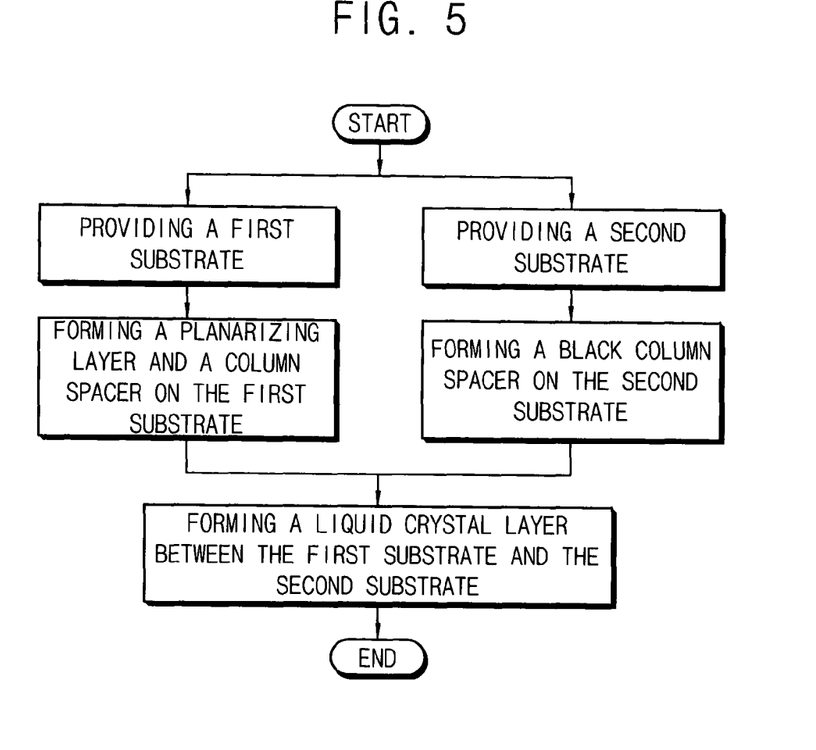
FIG. 5 is a flow chart illustrating an exemplary embodiment of a method of manufacturing a liquid crystal display apparatus.
Figure 6:
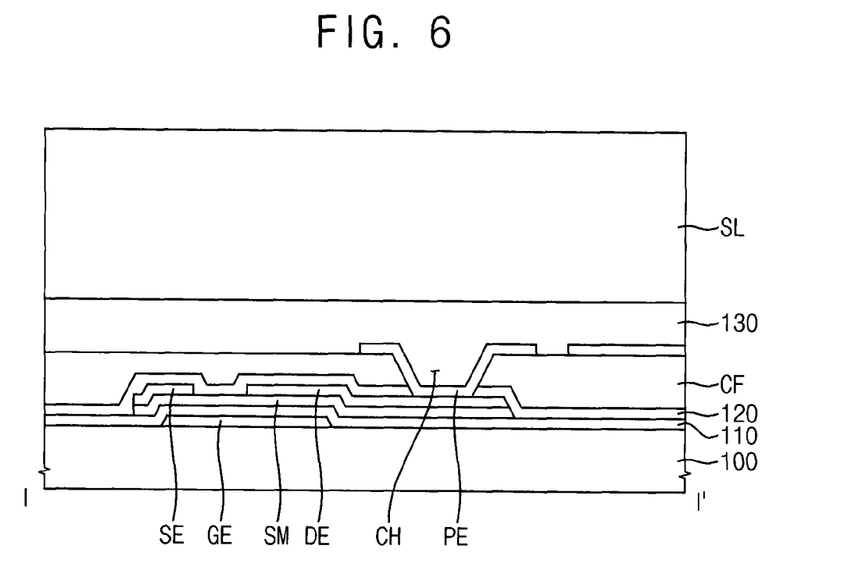
FIGS. 6 to 8 are cross-sectional views illustrating the method of manufacturing the liquid crystal display apparatus of FIG. 5.
Figure 7:
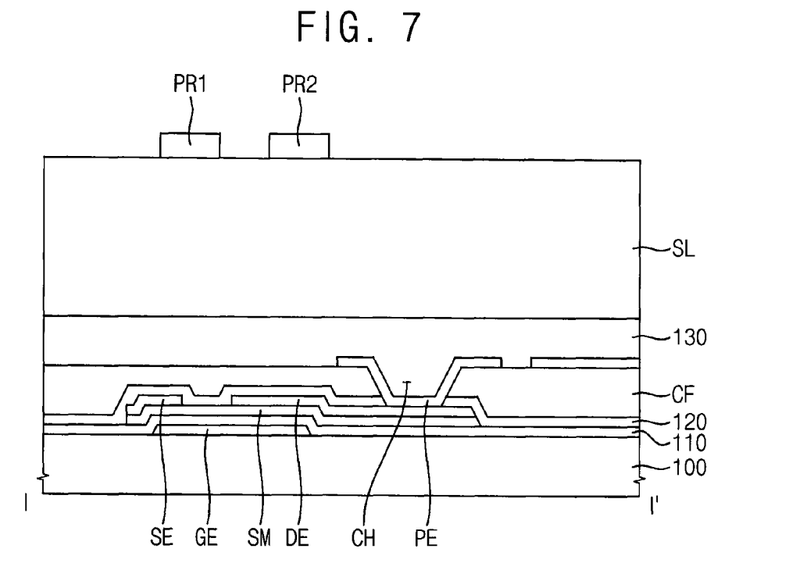
Figure 8:
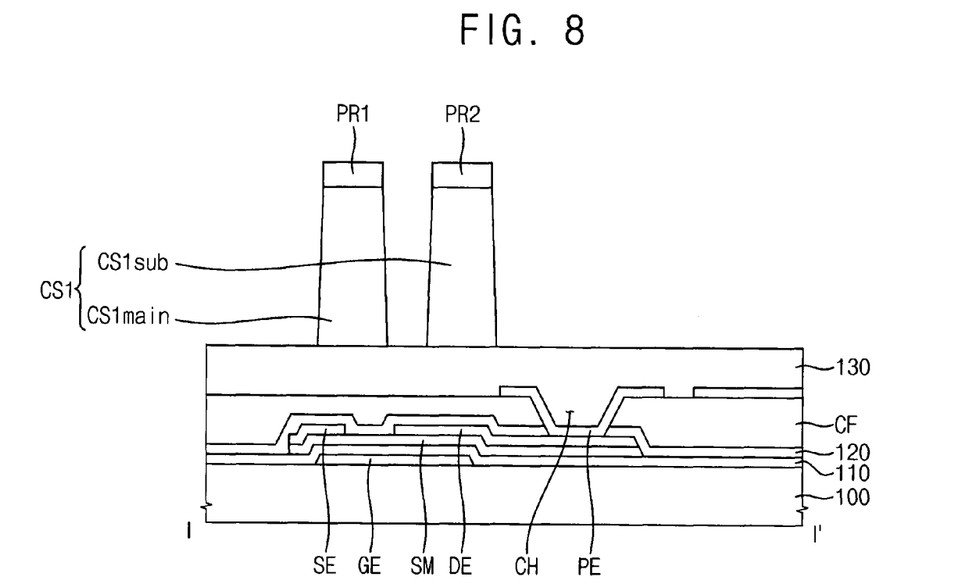

FIG. 5 is a flow chart illustrating an exemplary embodiment of a method of manufacturing a liquid crystal display apparatus. FIGS. 6 to 8 are cross-sectional views illustrating the method of manufacturing the liquid crystal display apparatus of FIG. 5.

Referring to FIGS. 5 to 8, a method for manufacturing a liquid crystal display apparatus is described in detail.

Referring to FIG. 5, a first substrate 100 may be provided, and then a planarizing layer 130 and a column spacer CS1 may be formed on the first substrate 100 of a first display panel. A second substrate 200 may be provided, and then a black column spacer may be formed on the second substrate 200 of a second display panel. The first substrate 100 and the second substrate 200 may be disposed to face each other, such that the first and second display panels face each other. A liquid crystal may be injected between the first substrate 100 and the second substrate 200 to form a liquid crystal layer 300. Also, the method may include injecting the liquid crystal between the first and second display panels to form the liquid crystal layer 300.

Referring to FIGS. 6 to 8, a silane-based hybride resin may be coated on the first substrate 100 to form a silane layer SL.

In an exemplary embodiment, for example, the silane-based hybride resin may include 3-methacryloxypropyldichlorosilane, 3-methacryloxypropyltrichlorosilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, (methacryloxymethyl)methyldimethoxysilane, (methacryloxymethyl)trimethoxysilane, (methacryloxymethyl)methyldiethoxysilane, methacryloxymethyltriethoxysilane, methacryloxypropyltriisopropoxysilane, 3-acryloxypropyldichlorosilane, 3-acryloxypropyltrichlorosilane, 3-acryloxypropylmethyldimethoxysilane, 3-acryloxypropylmethoxysilane or a combination thereof.

The silane-based hybride resin may be formed by copolymerizing a first monomer including acrylate group and a second monomer including a silane.

Generally, a silane-based resin has a low glass temperature (Tg) within a range of about 100° C. to about 200° C., so that the silane-based resin has excellent flow characteristics. Therefore, the silane-based hybride resin including the silane-based resin has excellent flow characteristics. The planarizing layer 130 may include the silane-based hybride resin, so that a flatness of an upper surface of the planarizing layer 130 may improve.

The silane-based hybride resin may further include a solvent to control viscosity and increase resin stability.

In an exemplary embodiment, for example, the solvent may be an aliphatic hydrocarbon solvent, an aromatic hydrocarbon solvent, a ketone solvent, an ether solvent, an acetate solvent, an alcohol solvent, an amide solvent, a silicone solvent or a combination thereof. In an exemplary embodiment, for example, the aliphatic hydrocarbon solvent may be hexane or heptane. In an exemplary embodiment, for example, the aromatic hydrocarbon solvent may be benzene, toluene or xylene. In an exemplary embodiment, for example, the ketone solvent may be methylethylketone, 1-methyl-2-pyrrolidinone, cyclohexanone or acetone. In an exemplary embodiment, for example, the ether solvent may be tetrahydrofuran, isopropyl ether or propylene glycol propyl ether. In an exemplary embodiment, for example, the acetate solvent may be ethyl acetate, butyl acetate or propylene glycol methyl ether acetate. In an exemplary embodiment, for example, the alcohol solvent may be isopropyl alcohol or butyl alcohol. In an exemplary embodiment, for example, the amide solvent may be dimethyl acetamide or dimethyl formamide.

A photoresist mask PR1 and PR2 may be formed on the silane layer SL. The photoresist mask PR1 and PR2 may overlap the TFT.

The silane layer SL may be dried. The silane layer SL may form a planarizing layer 130.

The first substrate 100 may be dried at a room temperature or by heating. In an exemplary embodiment, for example, the first substrate 100 may be dried within a temperature range of about 50° C. to about 200° C.

A drying rate of an area forming the photoresist mask PR1 and PR2 of the silane layer SL may be slower than another or remaining area of the silane layer SL. Thus, the area at which the photoresist PR1 and PR2 is not formed, may be dried more than the area forming the photoresist mask PR1 and PR2. Therefore, an upper surface of the planarizing layer 130 may be protruded to form a first column spacer CS1.

The silane layer SL may be dried, so that the planarizing layer 130 and the first column spacer CS1 may be formed at substantially the same time. Thus, the planarizing layer 130 and the first column spacer CS1 may include a substantially same material.

The first column spacer CS1 may be formed on a lower surface of the photoresist mask PR1 and PR2. The first column spacer CS1 may be formed on the TFT. The first column spacer CS1 may overlap the TFT.

The first substrate 100 may be developed to remove the photoresist mask PR1 and PR2. Thus, the first column spacer CS1, including the main column spacer CS1main and the sub column spacer CS1sub, may be formed.

Referring to FIGS. 3 and 5, a black column spacer may be formed on the second substrate 200.

A black photoresist may be coated on the second substrate 200.

The black photoresist may be a black material including a photosensitive organic material, a coloring agent and/or an initiator. The photosensitive organic material may be polymerized or decomposed by exposure to light having a specific wavelength. In an exemplary embodiment, for example, the black material may include a coloring agent, such as carbon black, organic/inorganic material, color pigment or the like.

The black photoresist may include at least two initiators having maximum energy absorption wavelengths different from each other.

The black photoresist may include a first initiator and a second initiator.

The first initiator may have a first maximum energy absorption wavelength reacting with a wavelength of a first light.

In an exemplary embodiment, for example, the first initiator may have the maximum energy absorption wavelength within a range of about 300 nanometers (nm) to about 600 nm. In an exemplary embodiment, for example, the first initiator may be titanocene-based initiator or acetophenone-based initiator.

The second initiator may have a second maximum energy absorption wavelength reacting with a wavelength of a second light.

In an exemplary embodiment, for example, the second initiator may have the maximum energy absorption wavelength within a range of about 200 nm to about 300 nm. In an exemplary embodiment, for example, the second initiator may be ester-based initiator, oxime-ester-based initiator, imidazole-based initiator or mercaptan-based initiator.

The black photoresist may be negative type photoresist.

The first light may be irradiated on the black photoresist, and then the black photoresist may be developed. A mask including a transparent area may be disposed on the black photoresist. The black photoresist may be polymerized and then hardened by irradiating the first light. A portion, which is not irradiated by the first light, may be developed, so that the portion may be removed.

The second light may be irradiated on the black photoresist. The second light may have an intensity less than that of the first light. A side surface of the second column spacer CS2 and the black matrix BM may have a tapered angle, in a cross-sectional view. The tapered angle may be controlled by the intensity of the second light.

The black photoresist may be heated and dried, thereby forming the black column spacer. When the black photoresist is not radiated by the second light, the black photoresist may reflow by heating. Thus, a border between the second column spacer CS2 and the black matrix BM of the black column spacer may be blurred, so that the black column spacer may not have a double stepped height.

Alternatively, a black photoresist may be coated on a color filter, and then the black photoresist may be irradiated once through a mask. The black photoresist may be developed and hardened, so that the black column spacer having the double stepped height may be formed. The mask may include a first area transmitting light, a blocking filter area transmitting a first light having a specific wavelength from an exposure and blocking a second light having another wavelength and a blocking area blocking light.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A liquid crystal display apparatus comprising:
a first substrate;
a second substrate facing the first substrate and including a black matrix;
a thin-film transistor on the first substrate;
a color filter on the thin film transistor;
a pixel electrode on the color filter to define a step therebetween; and
a planarizing layer disposed entirely on the color filter and the pixel electrode to planarize the step between the color filter and the pixel electrode;
wherein
the planarizing layer which planarizes the step between the color filter and the pixel electrode protrudes to form a first column spacer which maintains a cell gap between the first substrate and the second substrate, the first column spacer being on the thin film transistor,
the planarizing layer and the first column spacer each comprise a hybride resin comprising silane and are formed from a same layer of the hybride resin comprising the silane, and
a portion of the black matrix protrudes to form a second column spacer facing the first column spacer.

2. The liquid crystal display apparatus of claim 1, wherein a thickness of the planarizing layer which planarizes the step between the color filter and the pixel electrode is within a range of about 0.5 micrometer to about 2.0 micrometers.

3. The liquid crystal display apparatus of claim 1, wherein a height of the first column spacer is within a range of about 0.5 micrometer to about 3.0 micrometers.

4. The liquid crystal display apparatus of claim 1, wherein the first column spacer formed by the protruded planarizing layer comprises:
a main column spacer facing the second column spacer; and
a sub column spacer adjacent to the main column spacer, and facing the black matrix,
wherein the main column spacer and the sub column spacer each comprise the hybride resin comprising the silane and are formed from the same layer of the hybride resin comprising the silane as the planarizing layer.

5. The liquid crystal display apparatus of claim 4, wherein a height of the main column spacer is substantially the same as a height of the sub column spacer.

6. The liquid crystal display apparatus of claim 4, wherein a gap between the main column spacer and the sub column spacer is within a range of about 2.0 micrometers to about 3.0 micrometers.

7. The liquid crystal display apparatus of claim 1, wherein a height of the second column spacer is within a range of about 0.5 micrometer to about 2.0 micrometer.

8. The liquid crystal display apparatus of claim 1, further comprising an overcoating layer on the black matrix.

9. The liquid crystal display apparatus of claim 1, further comprising:
a liquid crystal layer between the first substrate and the second substrate.

10. A method of manufacturing a liquid crystal display apparatus, the method comprising:
forming a thin-film transistor on a first substrate;
forming a color filter by coating a color filter photoresist on the thin film transistor;
forming a pixel electrode on the color filter to define a step between the pixel electrode and the color filter;
forming a silane layer on the color filter and the pixel electrode having the step therebetween, by coating a hybride resin comprising silane;
forming a photoresist mask on the silane layer, the photoresist mask overlapping with the thin film transistor;
drying the silane layer to form at substantially the same time:
a planarizing layer which is disposed entirely on the color filter and the pixel electrode to planarize the step between the color filter and the pixel electrode, and
the planarizing layer protruded to form a first column spacer which is on the thin film transistor; and
forming a black matrix on a second substrate,
wherein
the planarizing layer and the first column spacer each comprise the hybride resin comprising the silane and are formed from a same silane layer of the hybride resin comprising the silane, and
a portion of the black matrix protrudes to form a second column spacer facing the first column spacer.

11. The method of claim 10, wherein the hybride resin comprising silane comprises 3-methacryloxypropyldichlorosilane, 3-methacryloxypropyltrichlorosilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, (methacryloxymethyl)methyldimethoxysilane, (methacryloxymethyl)trimethoxysilane, (methacryloxymethyl)methyldiethoxysilane, methacryloxymethyltriethoxysilane, methacryloxypropyltriisopropoxysilane, 3-acryloxypropyldichlorosilane, 3-acryloxypropyltrichlorosilane, 3-acryloxypropylmethyldimethoxysilane, or 3-acryloxypropylmethoxysilane.

12. The method of claim 10, wherein forming the black column spacer comprises:
coating a black photoresist on the second substrate;
irradiating a first light to the black photoresist, and developing the irradiated black photoresist;
irradiating a second light to the black photoresist, the second light having an intensity less than that of the first light; and
drying the black photoresist by heating.

13. The method of claim 12, wherein the black photoresist is negative-type photoresist.

14. The method of claim 12, wherein the black photoresist comprises two initiators having maximum energy absorption wavelengths different from each other.

15. The method of claim 14, wherein the black photoresist comprises:
   a first initiator having a first maximum energy absorption wavelength reacting with a wavelength of the first light; and
   a second initiator having a second maximum energy absorption wavelength reacting with a wavelength of the second light.

* * * * *